June 28, 1966 W. V. SPURLIN ET AL 3,258,111
ADJUSTABLE FEED ANGLE PARTS FEEDER
Filed Jan. 26, 1965 10 Sheets-Sheet 1

INVENTORS
WILLIAM V. SPURLIN &
WILLIAM J. WINANS
BY
CAROTHERS AND CAROTHERS
THEIR ATTORNEYS

INVENTORS
WILLIAM V. SPURLIN &
WILLIAM J. WINANS
BY
CAROTHERS AND CAROTHERS
THEIR ATTORNEYS

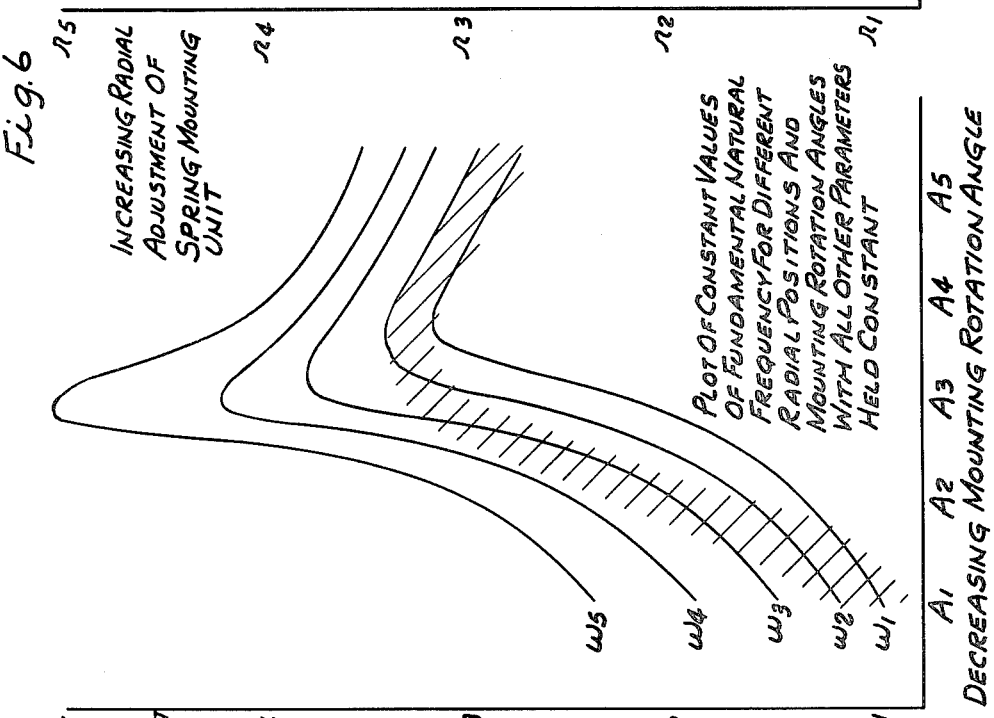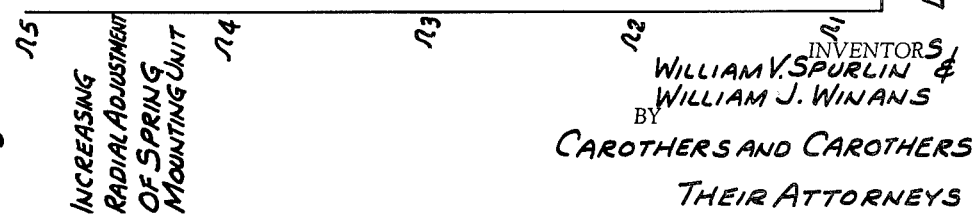

June 28, 1966 W. V. SPURLIN ETAL 3,258,111
ADJUSTABLE FEED ANGLE PARTS FEEDER
Filed Jan 26, 1965 10 Sheets-Sheet 4

INVENTORS
WILLIAM V. SPURLIN &
WILLIAM J. WINANS
BY
CAROTHERS AND CAROTHERS
THEIR ATTORNEYS

Fig. 14
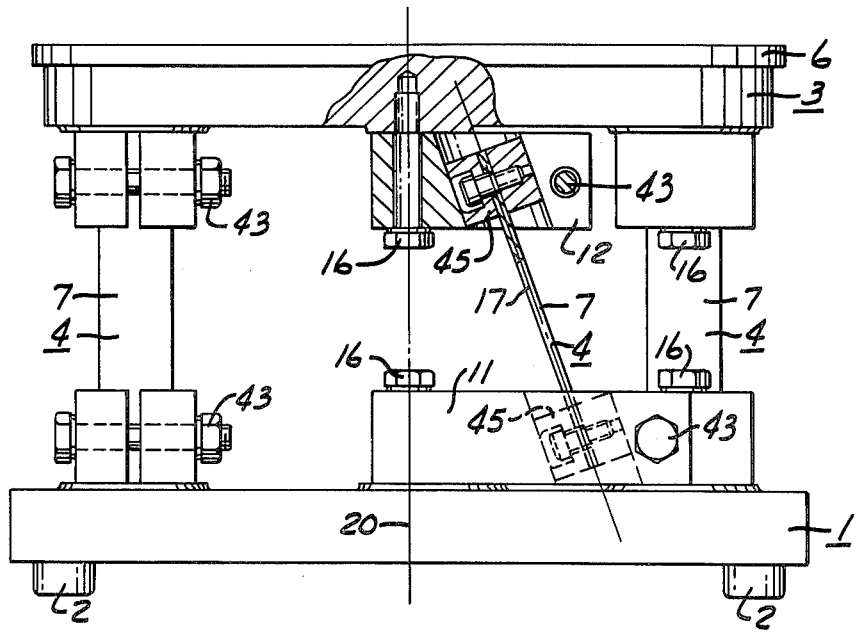
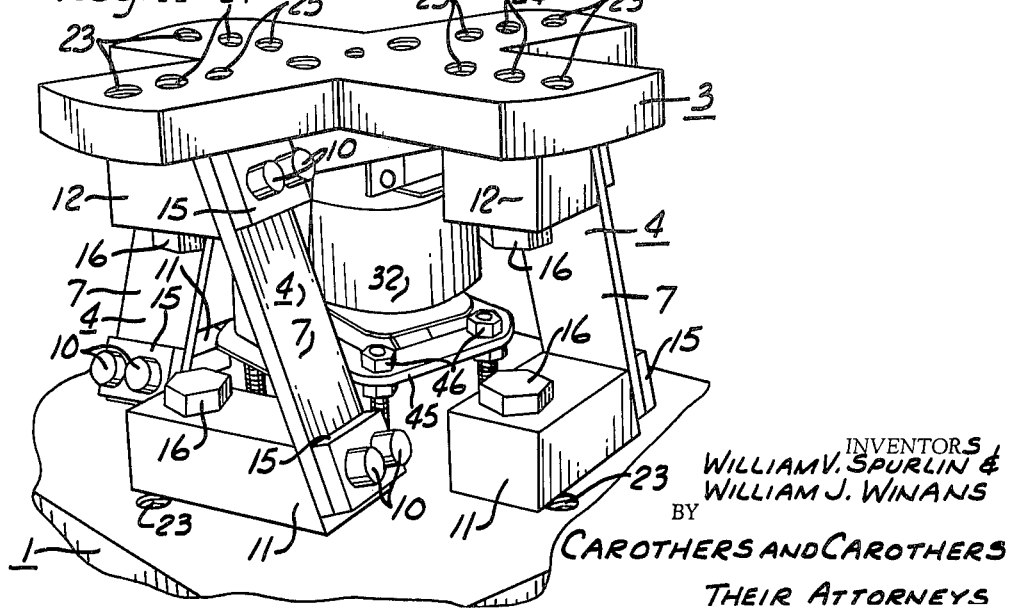
Fig. 11
INVENTORS
WILLIAM V. SPURLIN &
WILLIAM J. WINANS
BY
CAROTHERS AND CAROTHERS
THEIR ATTORNEYS June 28, 1966 W. V. SPURLIN ETAL 3,258,111
ADJUSTABLE FEED ANGLE PARTS FEEDER
Filed Jan. 26, 1965 10 Sheets-Sheet 6

INVENTORS
WILLIAM V. SPURLIN &
WILLIAM J. WINANS
BY
CAROTHERS AND CAROTHER.
THEIR ATTORNEYS

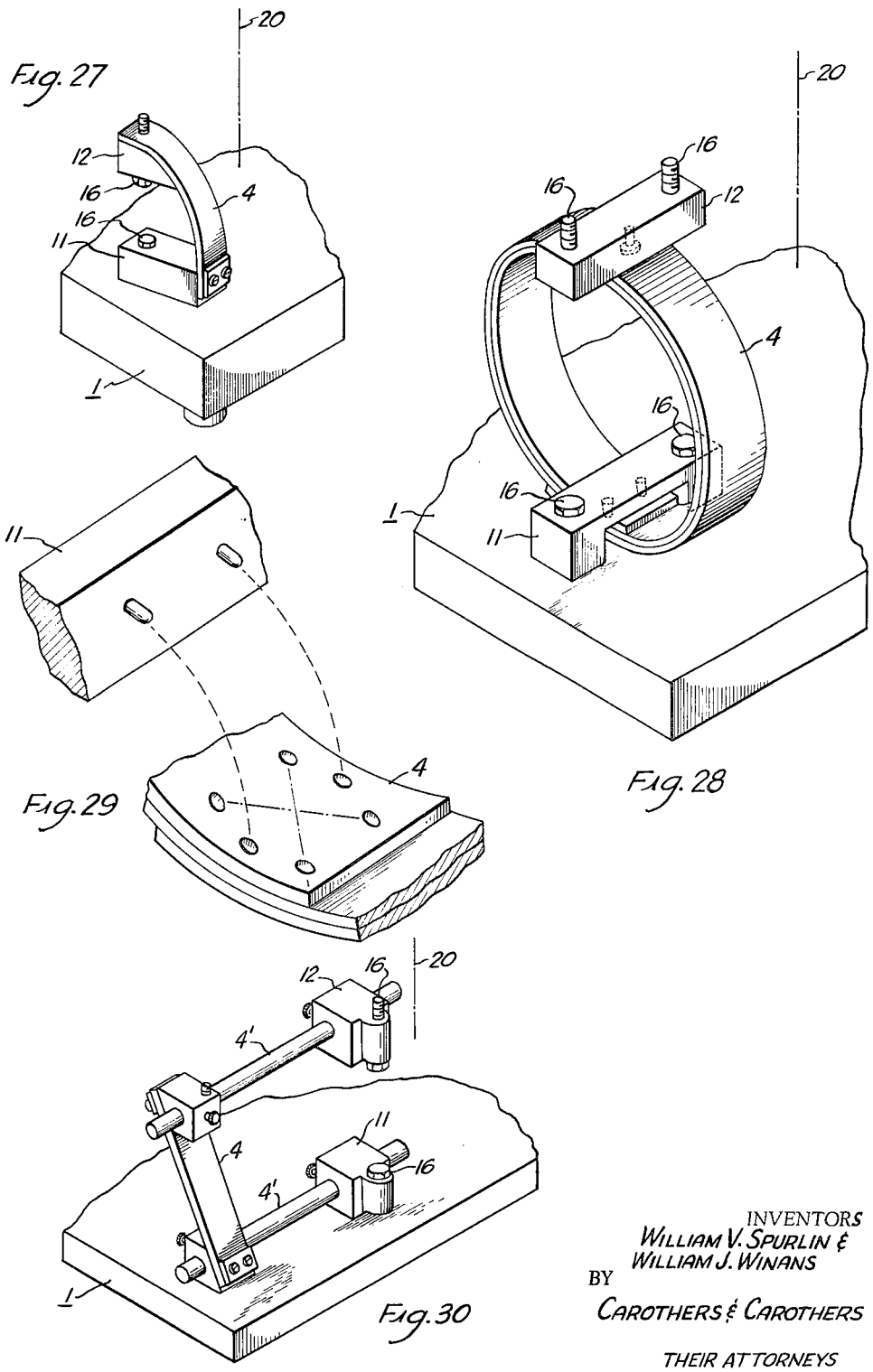

3,258,111
ADJUSTABLE FEED ANGLE PARTS FEEDER
William V. Spurlin and William J. Winans, Indiana, Pa., assignors to Link-Belt Company, a corporation of Illinois
Filed Jan. 26, 1965, Ser. No. 428,069
23 Claims. (Cl. 198—220)

This invention relates generally to a multiple mass vibratory system commonly employed as a material handling device or a vibrator and more particularly to a mounting means for changing the natural frequency of the vibratory device in combination with a change in the ratio of vertical to horizontal excursions of certain points on the vibratory system which, in the case of a material handling device, will constitute changing the feed angle.

This invention is applicable to a two mass torsional pendulum swing motor system having a base mass supported on isolators and a frame mass supported from the base mass by at least three spring units for obtaining a prescribed vibratory motion of the frame mass. Such a vibratory motion can be described by radial, rotational and vertical displacements relative to a central axis, normal to the base mass, and the equilibrium positions of the frame mass. This torsional pendulum swing motor system may be provided with a mounting means so that the position of this mounting device relative to its radial distance from the central axis and its angular orientation to a horizontal radial line from the central axis may be changed so as to alter the natural frequency of the swing system together with the orientation of the resulting vibratory motion of the frame mass. Such a two mass torsional pendulum swing motor system if driven by an electromagnetic motor means including a field member and an armature may necessarily require various air gaps between these members for different amplitudes of vibration. Thus it may be desirable to change the air gap for efficient operation at various amplitudes of vibration of the two mass system. This would be true of the swing motor whether it is made for a material handling device or whether it is constructed as a mere vibrator.

This two mass torsional pendulum swing motor system, generally related to in this invention, consists of two interrelated phases. One is the changing of the radial positioning and the orientation of the spring mounting system which couples the base mass to the frame mass, so as to vary the ratio of the vertical to horizontal excursions of the frame mass. The variance of this ratio in the case of a material handling device constitutes a change in the feed angle. The second phase is the changing of the radial positioning and the orientation of the spring mounting system, so as to vary the fundamental natural frequency of the two mass system. These two phases are interrelated to the extent that either the positioning or the orientation of the spring mounting system influences both the feed angle and the fundamental natural frequency; however, these two influences are controllable to the extent that desired combinations of the two effects are obtainable. This is due to the fact that the orientations of the springs affect the elastic constraining forces in direction and magnitude. The influence on the direction of the elastic constraining forces predominates in prescribing the orientation of the principal modes of the vibratory motion. The magnitude of these elastic forces opposing these principal modes of motion predominantly influences the stored elastic energy and hence affects the fundamental natural frequency of each of these principal modes of vibration.

Although the above describes a two mass torsional pendulum swing motor system, additional masses can be added while maintaining control of the magnitude and orientation of the principal modes of vibration in this same manner of radial positioning and orientation of the mounting means.

Such a two mass swing motor with the desired control can be accomplished by requiring at least three or more spring units to be disposed about a central axis. Each spring unit has its longitudinal axis lying in a vertical plane which intersects a plane defined by the vertical central axis and the point of attachment of the spring unit to the frame mass. At this intersection a horizontal angle is formed which is designated as the mounting rotation angle. The desired change in orientation can then be accomplished by a rotation of the spring unit about its point of attachment to the frame mass or about its point of attachment to the base mass or both points in either direction simultaneously.

A simplified form of such a mounting is by providing spring block seats, the springs being attached to the seats on these blocks and the blocks being attached independently to both the frame and base masses. These points of attachment of the spring block seats to frame mass and the base mass may or may not lie on a line normal to the base, but are of such a nature that both attached blocks can swivel, thereby permitting incremental changes in the mounting rotation angle.

In combining this change which predominantly influences the frequency of the swing system by merely rotating the spring units, with the radial adjustment of the spring units relative to the vertical central axis, one not only changes the frequency of the system but also accomplishes a change in the effective angle of feed. This radial adjustment may be performed by providing radial slots for the pivotal mounting spring blocks or cooperative arcuate slots for the radial and arcuate mounting of the spring blocks respectively on the base and frame of the swing motor system.

Another important object and advantage of this two mass torsional pendulum swing motor system is that the spring seat blocks may be swung through 180° and thus permit the swing motor to be applied to a feeder bowl having a track of the opposite hand. Thus the torsional pendulum swing motor system of this invention wherein the variance of the fundamental natural frequency of the swing system together with the variance of the effective feed angle of the vibratory motion combine to provide an improved and novel swing motor system which with a single type of base and motor and frame may supply a variety of different vibration characteristics of the torsional pendulum swing motors with the same motor parts.

Another feature of this invention is that the seat spring blocks may be radially grooved so as to provide specific increment positions of rotation for their mounting on the base and the frame to provide a predetermined increment position for the springs to effect a predetermined result in the operation of this two mass torsional pendulum swing motor system.

Another object is the provision of a two mass torsional pendulum swing motor system that may be provided with spring seat blocks or other mounting means that not only incremently change the relative distance of the spring units from the central axis as well as incremently change the orientation of the vertical plane containing the longitudinal axis of the spring, may also affect the inclination angle of this axis in its vertical plane. This provides still more variable characteristics of the vibration of the spring system which may be actuated by pneumatic or electrical rotary motor or pneumatic and hydraulic reciprocating motors and provides the same advantage for each type of driving force.

Other objects and advantages appear hereinafter in the following description and claims.

The accompanying drawings show for the purpose of exemplification without limiting this invention or the claims thereto certain practical embodiments illustrating the principles of this invention wherein:

FIG. 6 is a graph illustrating the effective change in feed angle for different radial adjustments of the spring units relative to the vertical central axis and at various rotation angle.

FIG. 7 is a graph illustrating the fundamental natural frequency for different radial adjustments and rotation angles shown thereon.

FIG. 11 is a perspective view of a two mass torsional pendulum swing motor system with electromagnetic motor.

FIG. 14 is a view illustrating the change in an additional variable of rotation of the spring with respect to the spring blocks.

Figure 23:
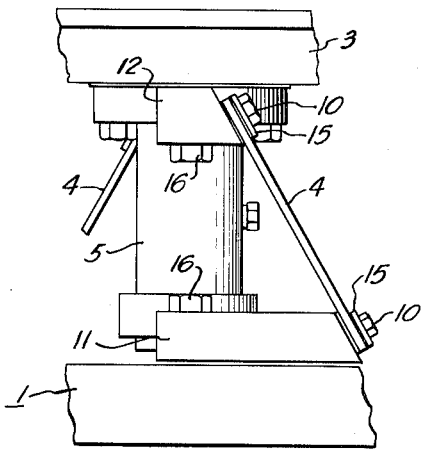

FIG. 23 demonstrates the application of a pneumatic rotary type motor drive.

Figure 24:
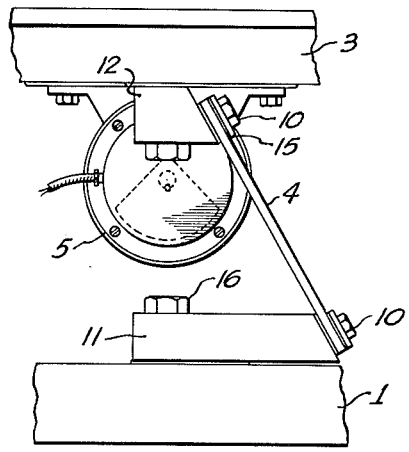

FIG. 24 shows a view of a rotary vibrator motor.

Figure 25:
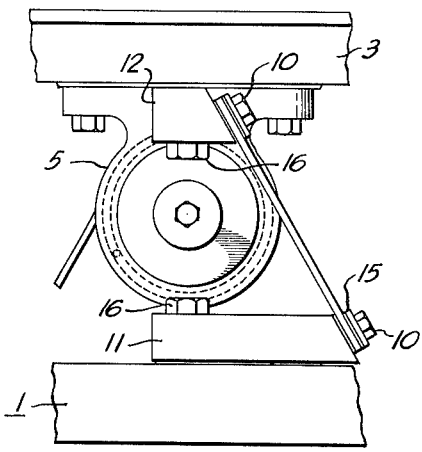

FIG. 25 demonstrates the application of a pneumatic piston type motor drive.

Figure 26:
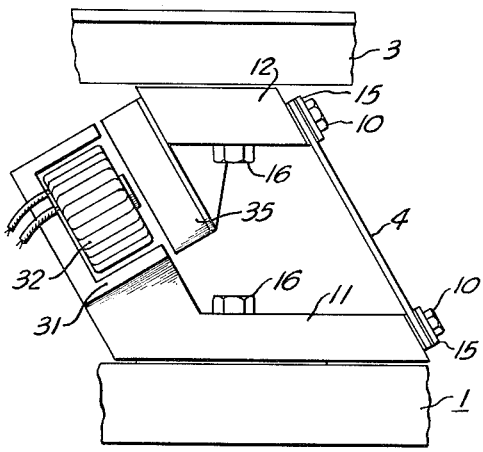

FIG. 26 is a view of another orientation of a set of force input mechanisms used to activate the torsional pendulum swing motor.

FIG. 27 is a perspective view of a bowed cantilever leaf spring secured to connecting blocks secured to the frame mass and base mass.

FIG. 28 is a perspective view of a loop spring secured to connecting blocks secured to the frame mass and base mass.

FIG. 29 is a perspective view of the connecting blocks showing a means to relative position the loop spring to the connecting blocks.

FIG. 30 is a perspective view of the mounting support means including a pair of torsion bars and connecting blocks to fasten the support means to the frame mass and base mass.

The two mass torsional pendulum swing motor system as illustrated in the drawings and more particularly in FIGS. 1 to 5, 8 and 9, and 11 to 13 consists of a base mass member 1 supported on isolators 2 with a frame mass 3 supported by the spring units 4 from the base and driven by a motor means 5. The base mass 1 is made preferably more massive by greater weight and rotational inertia than that of the frame mass so that the principal vibratory action will be given to the frame mass 3. This frame mass may include a material handling device, such as a feeder bowl, 6, in its weight and rotational inertia characteristics. This two mass system and the mountings that couple the frame mass and the base mass defines a swing motor system, which in this instance is powered by the electromagnet 5 but could well be operated by any other type of vibratory motor. FIGS. 23, 24, and 25 show respectively three additional motor types of: pneumatic piston motor, electric rotary vibrator motor and pneumatic rotary motor which are all designated by the number 5 in their respective figures.

Everything attached or carried by the frame mass 3 constitutes a certain mass which coupled to the base mass results in a combined inertial mass which provides a natural frequency depending upon the tuning of the spring units 4. These springs may be tuned by selecting the size and shape of a single spring such as illustrated at 7 in FIGS. 1, 2, 8 and 11 or by the dual springs as illustrated at 7 and 8 in FIGS. 12 and 13.

As shown the springs 7 and 8 are held by bolts 10 to the lower and upper spring blocks 11 and 12 each having a spring seat 13 on which is mounted a washer 14. A clamping bar 15 is provided under the heads of the cap screws 10.

Figure 1:
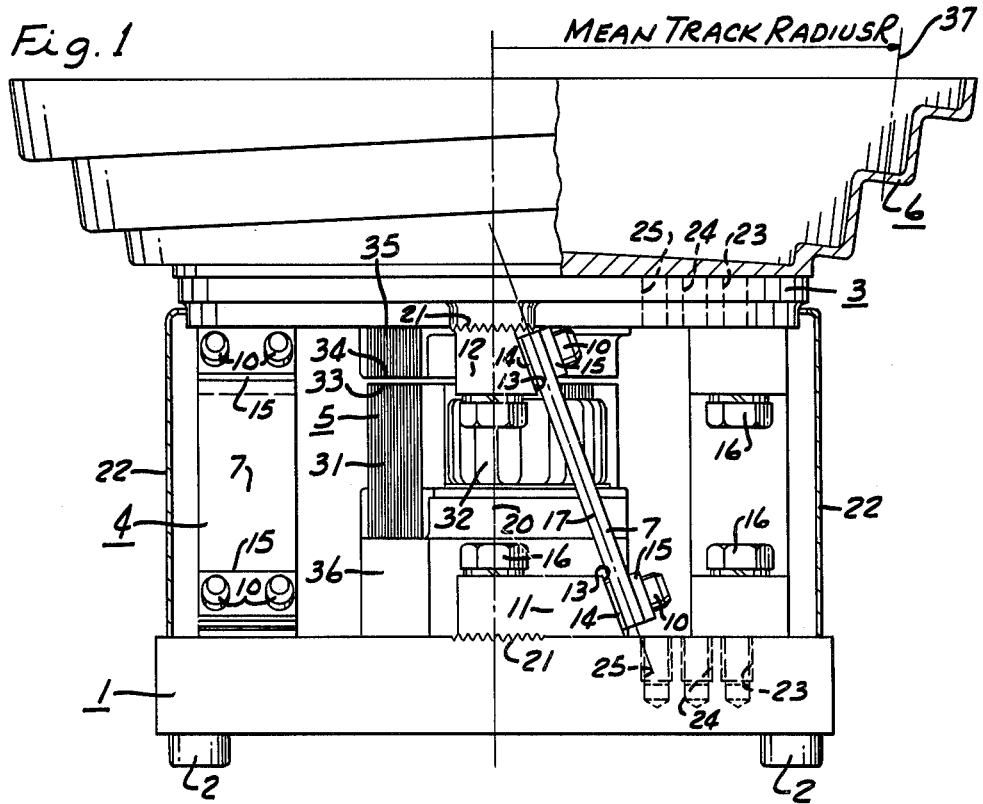
FIG. 1 is a view in side elevation of the feeder with the parts of the bowl and the housing in section.
Figure 2:
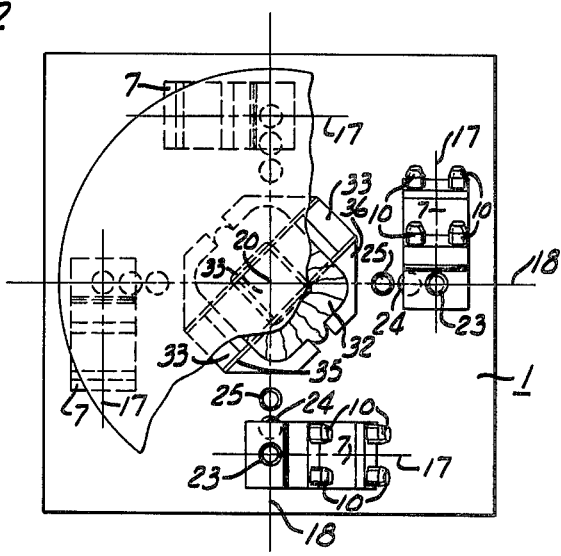
FIG. 2 is a plan view of the feeder motor including only the frame and the base with parts of the frame being cut away.

As shown in FIGS. 1 and 2 each of the spring blocks 11 and 12 are adjustably secured to the base mass 1 and the frame mass 3 respectively by the cap screws 16 under which is provided a spring lock washer and which is threadably received in its respective member so as to hold the spring assembly fixed relative to the base mass and the frame mass. As shown in FIGS. 1 and 2 these spring block members 11 and 12 are squared with the edge of the squared base mass and also are in alignment with the longitudinal axis 17 of the springs 7 and 8. The vertical plane of this longitudinal axis is at right angles to the radius 18 from the central axis 20.

Figure 5:
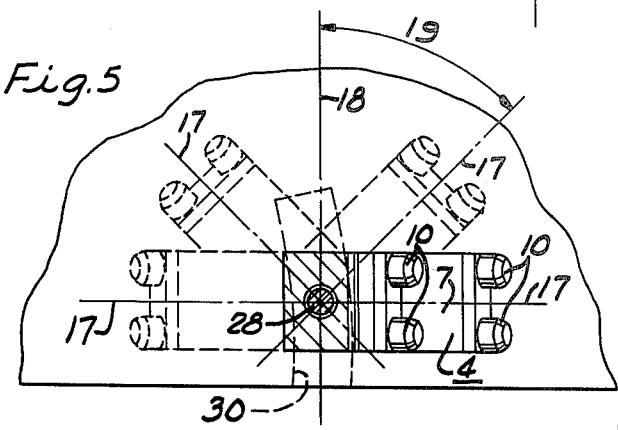
FIG. 5 is a top plan view of the base of the motor showing the relative positions of a spring unit and illustrating an arcuate path for the increment changes of the spring unit radially of the vertical central axis, as well as the mounting rotation angle.
Figure 8:
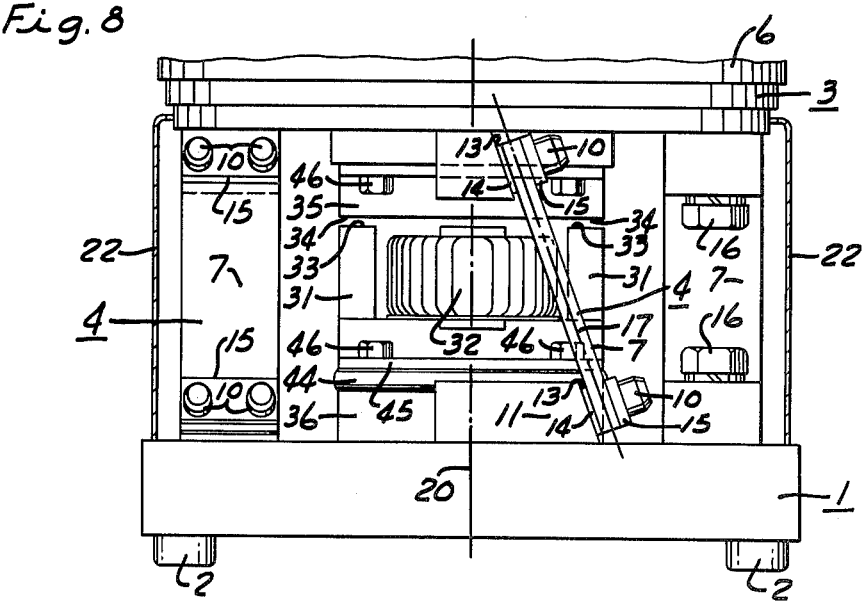
FIG. 8 is a view in side elevation of the two mass torsional pendulum swing motor system with a resilient mounting under the electromagnetic field member.

The clamping face of the blocks 11 and 12 may be serrated radially as indicated at 21 to prevent unintentional or unauthorized movement of these blocks about their clamping bolts 16. However, as shown in FIG. 5 the spring units 4 may be disposed with the longitudinal axis 17 of the springs from the position as shown in full lines to approximately 45° and any position of the mounting rotation angle 19 therebetween. They may also be adjusted somewhat in the opposite direction as that indicated by dotted lines. However, the cover 22 limits such adjustment. At this time it might be mentioned that when the cap bolts are loosened the whole of the spring unit may be pivoted 180° as illustrated so as to provide a torsional pendulum swing motor system for operating a feeder bowl of the opposite hand which system would have the same nicety of adjustment for the rotary position of each of the spring units 4.

Referring again to FIGS. 1 and 2 each of the cap screws 16 for securing the spring blocks to the base mass and the frame mass may be radially adjusted in the holes indicated at 23, 24 and 25 in both the base mass and frame mass as indicated. These holes are illustrated in FIG. 2 in the base mass 1 and this particular structure has each of the holes 23, 24 and 25 disposed on the vertical radial planes containing the central axis of the base member 1. In this instance each cardinal axis of the spring block unit passing vertically thru holes 23, 24 and 25 lies in the same radial plane with the different cardinal axis providing different radial positionings of the spring blocks. Thus aside from swinging the spring units 4 arcuately about its cardinal axis they may be adjusted in a plane radial to the central axis 20.

Figure 3:
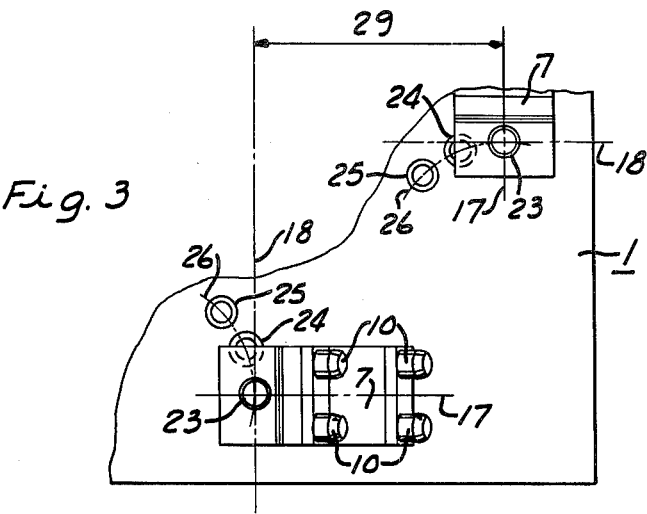
FIG. 3 is a partial plan view of the structure illustrated in FIG. 2 showing the holes disposed along an arc and the radial position.

FIG. 3 illustrates the holes 23, 24 and 25 along an arcuate curve 26. Thus the holes may be disposed so as to provide a different radius 29 as we progress inwardly toward the central axis 20.

Figure 4:
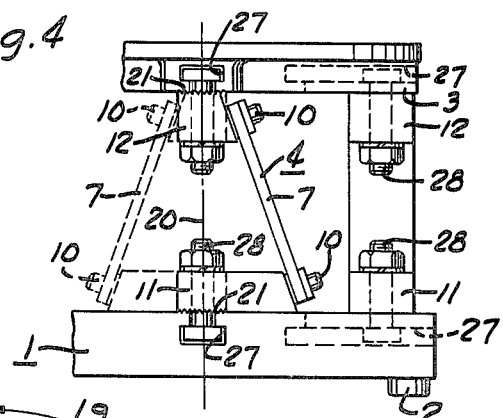
FIG. 4 is a view in side elevation showing a base and a frame connected by spring units with parts broken away and illustrating increment changes for moving the spring units inwardly on a radial line to the vertical central axis as illustrated in FIGS. 2 and 3.

Referring now to FIGS. 4 and 5 in place of the holes to receive the cap bolts 16 the base mass 1 and the frame mass 3 are provided with dove-tailed or T-shaped slots 27 on each of the cardinal positions of the spring units in the base mass 1 and the frame mass 3 which T-shaped slots are arranged to receive the heads of the cap bolts 28. These cap bolts are locked in place by a lock washer and nuts for securing the spring blocks 11 and 12 to their respective members in any number of increment positions radially positioning the cardinal axis along the radii 18. This permits an increment change in the location of the spring units relative to the central axis 20.

By the same token radial serrations 21 are provided under each of these spring block members so as to aid in securing the same in any selected arcuate position about the oppositely disposed centers of the cap bolts 28. Thus with this structure we may have an increment change in the rotary position of the spring blocks 11 and 12 as well as increment changes in their radial position and each spring unit may be changed 180° in the manner previously described so as to accommodate a feeder bowl of the opposite hand.

Referring now to FIG. 5 it will be noted that the T slot 30 in which the heads of the cap bolts 28 are secured is arcuate to provide a similar increment adjustment along a preselected arcuate curve of the slot to position the spring units respectively at a preselected position relative to the central axis 20 in a manner similar to the arcs 26 of FIG. 3.

Referring again to FIG. 1 the driving motor 5 as illustrated in FIGS. 1 and 2 is of the electromagnetic type being provided with a field core 31 of E-shape the central leg of which contains the coil winding 32 and the three pole faces 33 provide a uniform air gap 34 with the under face of the armature member 35 the latter being secured to the underside of the frame mass 3. The core of the electromagnetic field member being secured through the mounting block 36 to the top of the base mass 1.

As shown in FIG. 11 the cap bolt 16 is mounted in the second hole 24 the first hole 23 being open. The same holes are illustrated in the top of the frame and it will be noted that in FIG. 11 the spring units 4 are disposed at an angle less than 45° to the edge of the base mass 1. The electromagnetic field member portion of the driving device is secured to the base by bolts so that its elevation is determined by the positioning nuts 46.

Figure 12:
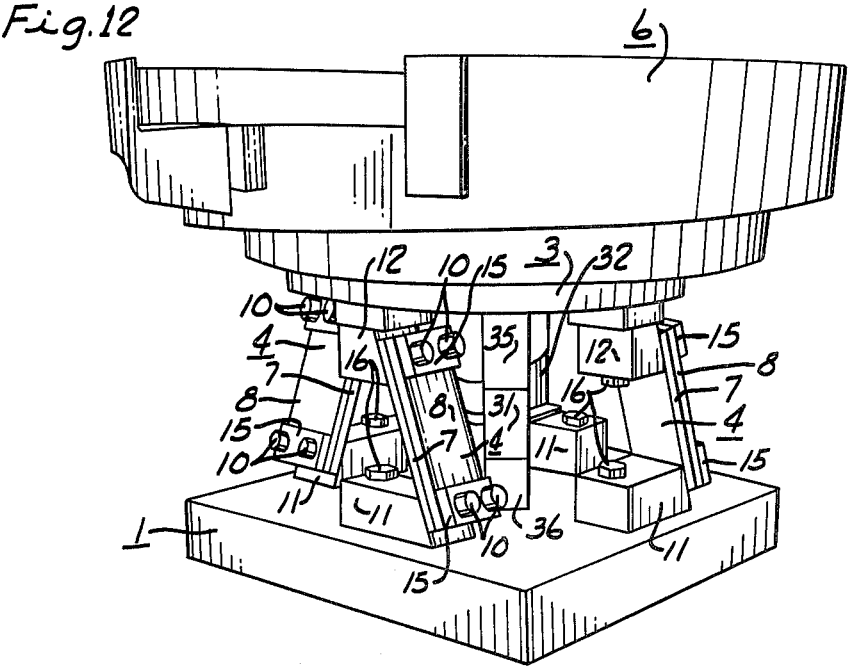
FIG. 12 is a perspective view of a two mass torsional pendulum swing motor system having a feeder bowl thereon showing the end of the track at discharge.
Figure 13:
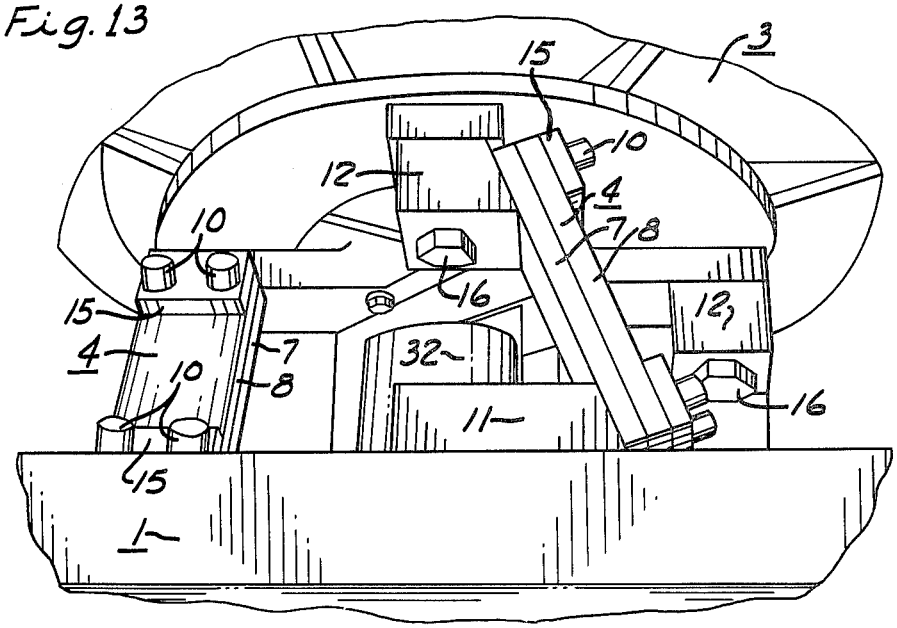
FIG. 13 is a perspective view showing the underside of the feeder bowl structure illustrated in FIG. 12.

In the structure shown in FIGS. 12 and 13 the core member is mounted on the block 36 and the armature is clearly shown. In FIGS. 12 and 13 each spring unit 4 comprises two spring members 7 and 8, each supported on a washer 14 between the spring 7 and the seat 13 and a similar washer is placed between the spring 7 and the spring 8 of each unit and a similar washer is also placed under the clamp plate 15 to provide uniform characteristics of these springs. The springs 7 and 8 as shown are cantilever springs which in this case are made of Fiberglas. The Fiberglas may have the principal characteristics of glass fibers disposed axially of the springs. However, there are considerable numbers of cross strands but the spring member as a whole is amorphous and is not subject to fretting or other type of destruction that frequently accompanies steel springs particularly at the joints where they are clamped. This fretting is the initial formation of a crack that may continue through a crystalline structure such as a steel spring. The amorphous structure of the glass spring, not having any crystalline structures through which the stresses may follow, has a high resistance against destruction in this manner or for these reasons. The fretting of steel springs may be materially reduced if not eradicated in some instances by the use of hard aluminum spacers which may flex within the elastic limit of the aluminum without permanent deformation. Other types of springs may be employed so long as they provide a guiding action to permit the frame mass to oscillate in the desired manner about the central axis 20.

Defining the tangent of effective feed angle $\pi$ to be the ratio of vertical to horizontal components of the excursion of the vibration motion of a point on the mean track radius R, the variance of this effective feed angle is indicated in FIG. 6 by showing constant feed angles as functions of both the radial positioning $r$, and the rotation angle A of the spring mounting fixtures. The mean track radius R is shown as 37 in FIG. 1, and the radial positioning $r$ is shown as 29 in FIG. 3, while the rotation angle A is designated as 19 in FIG. 5.

When the spring units made up of those torsional spring members 7 and 8 and are moved radially, let us say, progressively inward by mounting the same in the holes 23, 24 and 25 as shown in FIGS. 2 and 3, or radially inward by increments in the grooves 27 and 30 as shown in FIGS. 4 and 5, the resulting feed angle changes as indicated in FIG. 6. This change is depicted by a vertical line generated from any angle of rotation which cuts the different constant feed angle curves as the radial positioning is changed. The clamping face on the blocks of the spring units have the same angle of slope indicated by 13 in FIG. 1, but the effective feed angle changes when the spring units are moved radially of the device as brought out in FIG. 6.

The spring mounting units 7, 8, 11 and 12 can also be rotated so as to change the angle of mounting rotation 19. This angle is defined as the angle formed by two intersecting vertical planes whose line of intersection contains the point of attachment of the spring mounting unit to the frame mass. The two planes are those vertical planes generated by the longitudinal axis of the spring and vertical central axis so that both planes contain the point of attachment of the spring mounting unit and the frame mass. This angle which is designated as the angle of rotation of the spring mounting fixtures in FIG. 6 is shown as 45° in FIG. 5. When the angle of rotation is changed, the resulting feed angle varies as indicated in FIG. 6. This change is depicted by a horizontal line generated from an arbitrary radial position so as to cut constant feed angle curves. This is accomplished by a simple rotation of the mounting of the spring units.

FIG. 7 is a similar family of curves showing the constant values of fundamental natural frequency as determined by the radial positioning and rotation of spring mounting fixtures. This family of natural frequency curves is determined with constant values of the inertial masses involved.

Thus FIGS. 6 and 7 indicate that there exist various pairs of the output variables of effective feed angle and fundamental natural frequency as well as various pairs of the input variables of radial positioning and rotation of the spring mounting fixtures. The relation between these pairs of input and output variables is that a class or subgroup of output variables consisting of those pairs whose fundamental natural frequency fall within a certain predetermined interval of frequencies defines a class or subgroup of the input pairs. Although the frequency half of output variable pair is limited to the above interval, the feed angle varies over a broader range. Hence using this subgroup of the input pairs one can obtain a variety of output pairs limited in natural frequency but possessing a larger variation in feed angle. Conversely one could, in a similar manner, develop another subgroup of input pairs which result in a subgroup of output pairs possessing a limited interval of feed angles, but a larger variation in natural frequency.

As an example of the latter relation, one could choose an interval of feed angle to be less the $\pi_2$ of FIG. 6 and greater than $\pi_1$. This defines the subgroup of input pairs indicated by the shaded area of FIG. 6. This same shaded area of FIG. 7 demonstrates that the subgroup of output pairs while limited in feed angles between $\pi_2$ and $\pi_1$ possess a range of fundamental natural frequency whose upper limit is $\omega_4$ and with a lower limit of less than $\omega_1$.

It has been discovered that each influence of the parameters contained in the mounting system affects a different characteristic of the stored elastic energy and provides a measurable improvement in the swing motor system. To predetermine the influence of these parameters one can describe the stiffness characteristics of the mounting system in any appropriate coordinate frame. In the particular case of the system shown in FIG. 11, the stored elastic energy can be grouped in association with four modes of spring deformations: first the axial deformation of spring, second the bending of the spring on its minor axis, third the bending on its major axis and fourthly by angle of twist of the torsional bending of the spring about its longitudinal axis. Now the elastic energies associated with these deformations in accordance with the elastic nature of the spring material add together to form the total stored elastic energy.

Although this total elastic energy in each spring unit is uniquely determined by the four deformations in the above said coordinate frame, its influence on the vibratory motion of the total system is dependent upon the orientation of this said coordinate frame to a second inertial coordinate frame. This indicates a natural subdivision of the parameters associated with the spring units. First, those parameters which influence the magnitude of elastic energy associated with each mode of deformation are designated, spring stiffness characteristics, and secondly, those parameters which influence the transformation between that coordinate frame of the spring deformations and the inertial coordinate frame of the remaining portion of the system are designated spring orientation characteristics.

These latter characteristics include the two input variables of radial positioning and rotation of the spring mounting fixtures.

Figure 10:
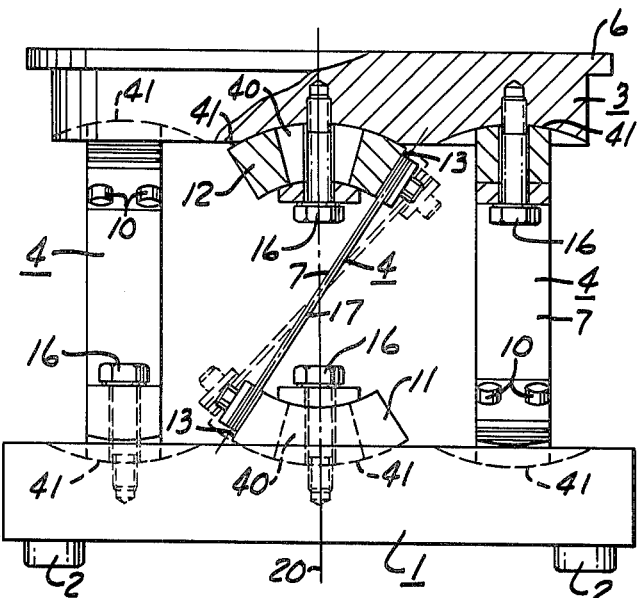
FIG. 10 is a view illustrating the change in the slope of the spring block seat.
Figure 9:
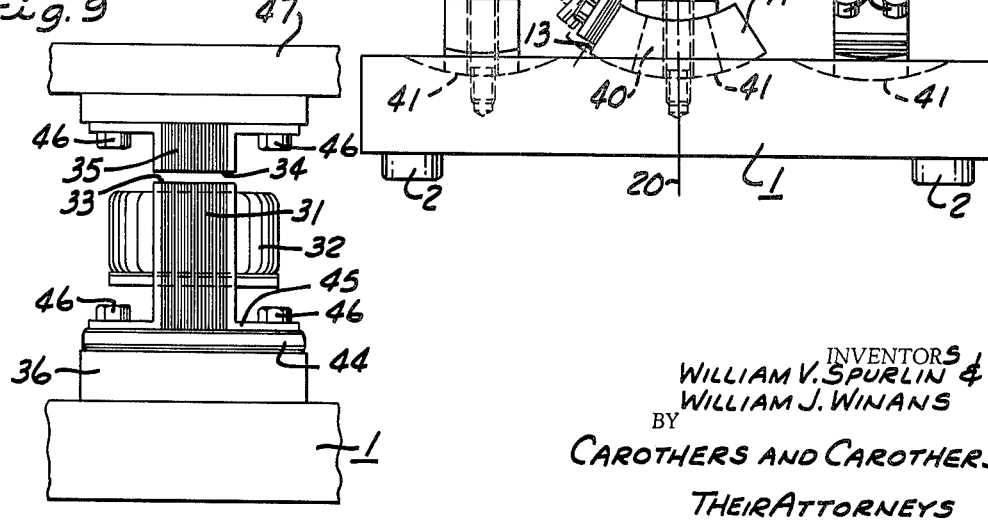
FIG. 9 is a view in vertical section of a motor vibrator having the same mounting system shown in FIG. 8.

From among the various spring orientation characteristic parameters only these two input variables are changed in the families curves of FIGS. 6 and 7. Other such parameters could be changed by various means. Two such variations are exemplified in FIGS. 10 and 14. The angle of inclination of the spring, which was fixed by the slope of the face of the spring seat 13, in FIGS. 6 and 7, can be varied as demonstrated in FIG. 10. This indicates a method of adjusting the slope of the seat 13 without restraining the variation of the two input variables. This is accomplished by positioning blocks 11 and 12 in the fixed vertical plane containing the longitudinal axis of the spring within the limits imposed by the slot 40 in these blocks. The spherical surfaces 41 of these blocks 11 and 12 are secured to mating spherical seats in the frame and base mass by the bolts 16. The radial positioning can be changed by different radial positionings of the spherical seats which accept the spring mounting blocks 11 and 12. Hence the input variables could be considered to be the variable slope of this seat 13 and the variable of the mounting rotation angle which still can be accomplished by rotation of the spring mounting unit in its spherical seat.

FIG. 14 demonstrates another method of making a still different spring orientation characteristic parameter an input variable. In this application still another spring orientation characteristic parameter is made a variable in that the rotation of the leaf spring within the blocks 11 and 12 is added to the mounting rotation angle and the radial positioning to produce three different input variables. This is accomplished by securing two half cylinders 45 to each end of the spring 4 which together can be rotated about the longitudinal axis of the spring within the split blocks 11 and 12 and fixed at any arbitrary angle by pinching these cylinder halves 45 in the blocks with the fastener 43.

The first subdivision of parameters classified above as the spring stiffness characteristics were also held constant in the development of the curves in FIGS. 6 and 7. Also held constant were the inertial parameter of the weight of the moving masses and the rotational inertia of these masses.

The following is a consideration of this first subdivision of parameters. A method of changing the spring stiffness characteristics of the cantilever spring is to provide a reduction in the area of inertia adjacent the node position of the vibration of the spring which also compensates for the stress difference along the longitudinal axis of the cantilever spring. This may be accomplished by placing an opening in the shape of a circle or an ellipses of different contours or by reducing the width of the spring adjacent the node position, both of which have reduced the area of inertia to effectively change the operating characteristics of the swing system for different radial positions of the spring units as well as the different angular positions of the spring units about their mounting bolts.

Another way of effecting the operation of the swing motor system for stiffness is the provision of some means to provide a radially flexible section in the mounting system of the cantilever springs relative to either the reaction of the base mass or the frame mass. The variations of these many factors may cooperate with each other to produce a more efficient and more desirable two mass torsional pendulum swing motor system such as a vibratory feeder.

Figure 15:
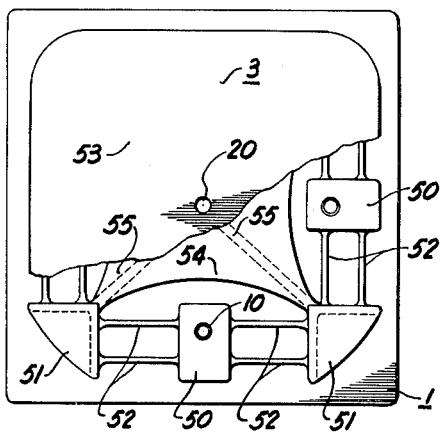
FIG. 15 is a plan view with parts broken away showing a feeder frame with radially flexible block means for supporting the free end of the cantilever springs.
Figure 16:
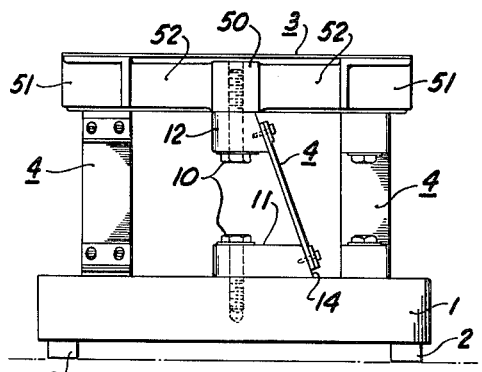
FIG. 16 is a view in side elevation of the radially flexible feeder frame of FIG. 15.

As shown in FIGS. 15 and 16, the base mass member 1 is supported on the isolators 2. The frame mass 3 is supported by the cantilever spring units 4 which include the lower and upper spring blocks 11 and 12 held between bolts 10 to the base mass 1 and the frame mass 3 respectively.

In the structure shown in FIGS. 15 and 16, the upper spring block 12 is made integral with the intermediate block section 50, which in turn is connected to the corner block 51 by means of the parallel flexible arms 52. The corner blocks 51 are made integral with the top pan or face 53 of the frame 3 which is provided with the central mounting bolt hole for receiving some feeder structure such as a feeder bowl. An intermediate stiffening member as illustrated by the web 54 secured to the top of the radial beam members 55 which in turn are secured to the intercorners of each of the corner block members 51 for the purpose of stiffening the unit without adding material weight.

Thus, by securing the upper spring blocks 12 to their respective intermediate block section 50, these integral blocks 12 and 50 may be located relative to the vertical central axis 20 at a point below the intermediate block section 50 which are shown to be connected on both sides, however, these integral blocks could be supported only from one side as a cantilever spring in its connection to only one corner 51 of the frame 3. In any event, the effective stiffness of the cantilever spring units 4 are relative somewhat between radial movement of the block 50 relative to the vertical axis of rotation 20.

Figure 17:
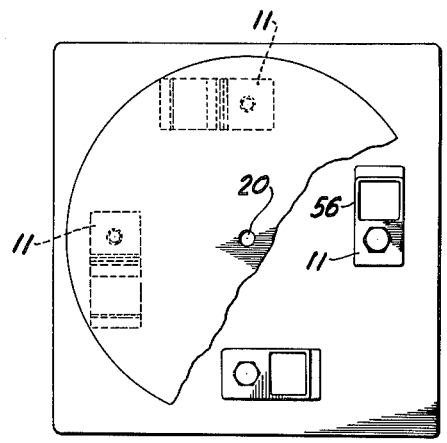
FIG. 17 is a plan view with parts broken away showing a reaction base mass with radially flexible block means for supporting the anchored end of the cantilever spring thereto.
Figure 18:
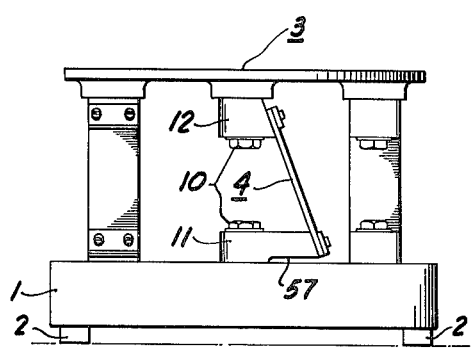
FIG. 18 is a view in side elevation of the structure shown in FIG. 17.
Figure 19:
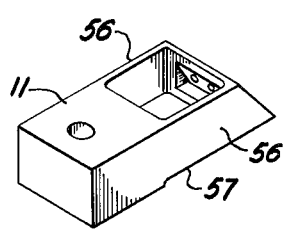
FIG. 19 is a perspective view of two blocks shown in FIGS. 17 and 18.

As shown in FIGS. 17 and 18 and 19, the frame member 3 is similar to that shown in FIG. 1, however, the lower spring block 11 has been modified as shown in FIGS. 17 and 19 with the opening therein producing the vertically disclosed sides 56 which are raised from the top surface of the base mass 1 as indicated at 57. These flexible sections permit the radial movement due to bending strains placed on the spring units 4. Thus, a feeder motor may be provided with the intermediate block section 50 on the underside of the frame 3 or the flex portion 56 of the spring block 11 or a combination of both which permits radial flexibility of these members to cooperate with the radial and rotary adjustment of the spring units relative to the vertical central axis of rotation 20 as well as relative to the axis of the mounting bolts 10 to provide the different combinations of the several factors in operating these systems.

Figure 20:
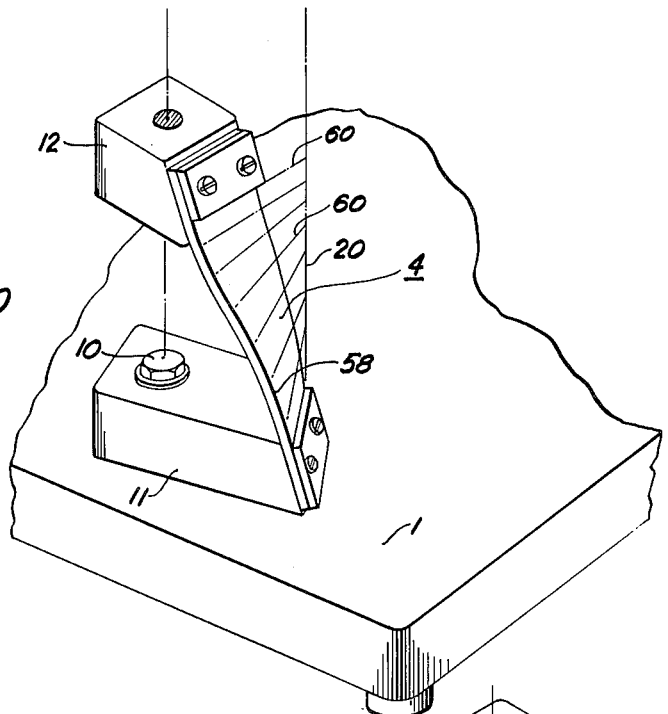
FIG. 20 is a perspective view of a cantilever spring unit on a base wall wherein the cantilever spring has a set twist.

As shown in FIG. 20, the spring units 4 with their mounting blocks 11 and 12 are bolted to the top of the base mass 1 and have a predetermined preformed twist about its longitudinal axis as indicated at 58. When the preformed twist is set in the spring and the mounting blocks 11 and 12 are secured to the base mass 1 and the frame 3 each horizontal line 60 across the curved face of the spring owing to the twist, will intersect the vertical central axis 20 as indicated in FIG. 20. This preformed twist 58 in the spring unit 4 has the effect of changing the stress along the longitudinal axis of the cantilever spring. Each point along the longitudinal axis of the spring lies in a horizontal line across the face of the spring. The twist in the spring positions these lines 60 radially to the axis of rotation or the vertical central axis 20.

Figure 21:
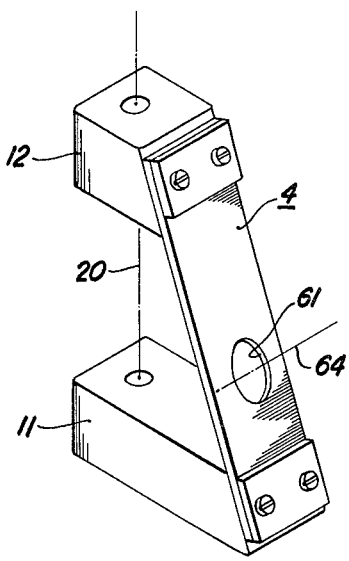
FIG. 21 is a perspective view of a cantilever spring unit wherein the inertial area is reduced by a hole at the node position of vibration of the spring.
Figure 22:
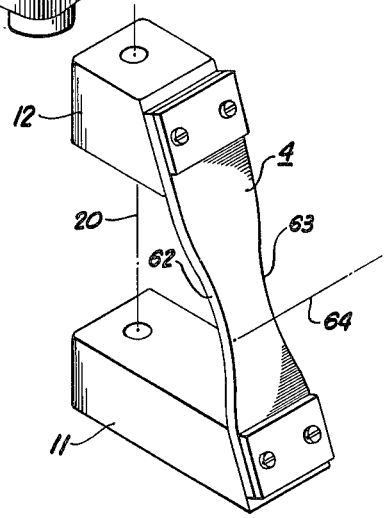
FIG. 22 is a perspective view of a cantilever spring unit wherein the inertial area is reduced by side indentations of the spring at node vibration position.

As shown in FIGS. 21 and 22, the spring units 4 secured to their mounting blocks 11 and 12 are provided with a reduction in their area of inertia adjacent the node position of the cantilever spring in vibration, which is approximately ⅓ from the bottom of the spring.

In FIG. 21 the area of inertia has been reduced by the opening 61 which may be of any shape such as circular, elliptical or even diamond shaped with fillets in the corner. Here the sides of the spring are parallel and the area of inertia represents the simplest cross section areas of the remaining springs in the largest dimensions of the hole 61.

In the structure shown in FIG. 22 one or both sides of the spring are curved inwardly as indicated at 62 and 63 to reduce the cross sectional area of the spring at the node point 64 to provide a reduction in the area of inertia adjacent the node position of the vibration of the spring to compensate for the stress difference along the longitudinal axis of the cantilever spring.

Thus, different shapes as well as preformed longitudinal twists transverse of the cantilever springs may be provided independently or in combination, not only to each other but with the radial flexing mounting block structures as shown in FIGS. 15 to 19 and together constitute spring stiffness characteristics parameters whose variations provide many different combinations of operating conditions resulting from the variation of the input variables mentioned above. In this manner one structure representing a complete feeder bowl may be readily tuned to set entirely different operating conditions for different loads and different configurations as well as weight of the article being handled.

Another method of incorporating the forcing drive in the torsional pendulum swing motor is shown in FIG. 26. This method orientates the direction of the one or more lines of force inputs 5 to be normal to the springs 4. Such an application of a set of input drives powered by pneumatic or electrical means will not interfere with the above mentioned variables used in controlling the resulting modes of vibration. Thus, the set of input driving mechanism can be orientated in any manner which provides an energy exchange to the vibrating system.

As defined in the claims the spring units 4 may be varied in structure to provide variable ranges of change in both the natural frequency and the feed angle. This can be accomplished by a predetermined elastic rigidity which in addition to the preformed twist of FIG. 20, and the change in area of inertia shown in FIGS. 21 and 22, can also be accomplished by the methods shown in FIGS. 27, 28 and 30. FIG. 27 shows a bowed leaf spring 4 secured to the base mass and frame mass by blocks 11 and 12 respectively. As shown in FIG. 28 a loop spring 4 of strip material is used. The rigidity of this spring can vary at different positions of the loop to obtain a predetermined stiffness of this elastic mounting means. The modification shown in FIG. 30 includes a pair of torsion bars 41 secured to blocks 11 and 12.

These elastic mounting support means of FIGS. 27, 28 and 30 have the same input variables of radial positioning and mounting rotation angle which are used to effect a predetermined variation in both natural frequency and feed angle. In FIGS. 27 and 30 this is accomplished by radial positioning of the cap bolt 16 and the swivel of blocks 11 and 12 about this cap bolt 16. In FIG. 29 a method of changing the mounting rotation angle of the device shown in FIG. 28 is accomplished by a set of relative positions between the spring unit 4 and the spring blocks 11 and 12.

All of these methods influence the stiffness of the elastic mounting means so as to vary the range of the change in natural frequency and feed angle. The other and counterpart is the connecting members such as the flexible frame section 52 and spring blocks 56 shown in FIGS. 15 and 17. Both types of these flexibilities influence the range of the change in natural frequency and feed angle as well as the stress levels in the leaf spring units.

We claim:

1. A multiple mass torsional pendulum swing motor system consisting of a plurality of masses coupled by elastic mounting support means, said masses including one or more frame masses and base masses, so as to achieve a compound vibration of said frame masses each described by three orthogonal components of the excursion of arbitrary points on its frame mass, said elastic mounting supports of said frame mass located in spaced relation about a central axis of rotation of said frame mass, means to secure said elastic mounting support means to their respective masses at aligned common radii from said central axis to orient each of said elastic support means and cooperatively change the natural frequency and feed angle of the swing motor system.

2. A two mass torsional pendulum swing motor system including a base mass supported on isolators, a frame mass supported by at least three elastic mounting support means from said base mass for obtaining a compound vibration of said frame mass described by the three orthogonal components of the excursions of predetermined points located on the frame mass, said elastic mounting support means located in spaced relation about a central axis of rotation of said frame mass, means to secure said elastic mounting support means to said base mass and to said frame mass at aligned common radii from said central axis to orient said elastic mounting support means by a change in the mounting rotation angle of said elastic mounting support means relative to radii from said central axis to change the natural frequency and the feed angle of the swing motor system.

3. A two mass torsional pendulum swing motor system including a base mass supported on isolators, a frame mass supported by at least three elastic mounting support means from said base mass for compound vibration described by three orthogonal components of the excursions of arbitrary points on the frame mass, said elastic mounting support means located in spaced relation about a central axis of rotation of said frame mass, means to secure said elastic mounting support means to said base mass and to orient said elastic mounting support means and change the radial positions of said elastic mounting support means relative to said central axis to affect a change in feed angle and natural frequency of the swing motor system.

4. The two mass torsional pendulum swing motor of claim 3 which also includes in said means to secure each elastic mounting support to the base mass and to the frame mass, a means to incrementally change the radial distance of the elastic mounting supports along an arcuate curve relative to said central axis.

5. A two mass torsional pendulum swing motor system including a base mass supported on isolators, a frame mass supported by at least three elastic mounting support means from said base mass for compound vibration described by three orthogonal components of the excursions of arbitrary points on the frame mass, said elastic mounting support means located in spaced relation about a central axis of rotation of said frame mass, means to secure said elastic mounting support means to said base mass at aligned common radii from said central axis to orient said elastic mounting support means by change in the radial positions of said elastic mounting support means relative to said central axis and in combination with a change in the mounting rotation angle of said elastic mounting support means to affect a change in feed angle and natural frequency of the swing motor system.

6. The two mass torsional pendulum swing motor of claim 5 which also includes in said means to secure each elastic mounting support to the base mass and to the frame mass, a means to incrementally change the radial distance of the elastic mounting supports along an arcuate curve relative to said central axis.

7. A two mass torsional pendulum swing motor system including a base mass supported on isolators, a frame mass supported by at least three elastic mounting support means from said base mass for compound vibration described by three orthogonal components of the excursions of arbitrary points on the frame mass, said elastic mounting support means located in spaced relation about a central axis of rotation of said frame mass, means to secure said elastic mounting support means to said base mass at aligned common radii from said central axis to orient said elastic mounting support means by change in the radial positions of said elastic mounting support means relative to said central axis and in combination with a change in the mounting rotation angle of said elastic mounting support means to affect a change in only the feed angle of the swing motor system and maintain a constant natural frequency of the system.

8. A two mass torsional pendulum swing motor system including a base mass supported on isolators, a frame mass supported by at least three elastic mounting support means from said base mass for compound vibration described by three orthogonal components of the excursions of arbitrary points on the frame mass, said elastic mounting support means located in spaced relation about a central axis of rotation of said frame mass, means to secure said elastic mounting support means to said base mass at aligned common radii from said central axis to orient said elastic mounting support means by change in the radial positions of said elastic mounting support means relative to said central axis and in combination with a change in the mounting rotation angle of said elastic mounting support means to affect a change in only the natural frequency of the swing motor system and maintain the same feed angle of the frame mass.

9. A two mass torsional pendulum swing motor including a reaction base mass supported on isolators and a frame mass supported by at least three elastic mounting support means from said base mass for a compound vibration described by three orthogonal components of the excursions of points located on the frame mass, said elastic mounting support means mounted in spaced relation about a central axis of rotation of said frame mass, means to secure said elastic mounting support means to said base mass and frame mass at aligned common radii from said central axis to suspend said frame mass as a swing system, said elastic mounting means including leaf spring members and connecting members securing the ends of the leaf spring members to provide said mounting means, at least one of said members being constructed and arranged to selectively effect variations in the frequency and variations of said frame mass.

10. A two mass torsional pendulum swing motor including a reaction base mass supported on isolators and a frame mass supported by at least three elastic mounting support means from said base mass for a compound vibration described by three orthogonal components of points located on the frame mass, said elastic mounting support means mounted in spaced relation about a central axis of rotation of said frame mass, means to secure said elastic mounting support means to said base mass and frame mass at aligned common radii from said central axis to dispose the orientation of the longitudinal spring axis by the location of elastic support means and to include a laterally flexible section in said elastic mounting supports secured to at least one of said masses to flex due to loads transmitted through said elastic supports.

11. The two mass torsional swing motor of claim 10 wherein additional elastic support means is incorporated as an integral part of the frame mass by a radially flexible section of these elastic supports extending into the structure of the frame.

12. A two mass torsional pendulum swing motor including a reaction base mass supported on isolators and a frame mass supported by at least three elastic mounting support means from said base mass for a compound vibration described by three orthogonal components of the excursions of points located on the frame mass, said elastic mounting support means located in spaced relation about a central axis of rotation of said frame mass and including cantilever leaf springs in each of said elastic support means and connecting means to secure their ends to said reaction base mass and to said frame mass, each spring having a preformed longitudinal twist about the longitudinal axis of the cantilever spring.

13. The two mass torsional pendulum swing motor of claim 12 wherein the elastic mounting support means contain springs having a reduction in the area of inertia located along the longitudinal axis adjacent to the node position of its vibration to influence the elastic energy stored in the springs so as to affect the resulting vibration of said frame mass.

14. A two mass torsional pendulum swing motor including a reaction base mass supported on isolators and a frame mass supported for compound vibration described by three orthogonal components of the excursions of points located on the frame mass by at least three elastic mounting support means located in spaced relation about a central axis of rotation of said frame mass, cantilever leaf springs in each of said elastic mounting support means, connecting means to secure the ends of said cantilever springs to said reaction base mass and to said frame mass to radially position and orient said springs to cooperatively change the natural frequency and feed angle of the swing motor system, and a laterally flexible section in selected connecting means connecting said springs to at least one of said masses to flex due to loads on said cantilever springs, said cantilever spring having an area of inertia along its longitudinal axis prescribed by the cross sectional area and angle of twist in the spring.

15. The two mass torsional swing motor of claim 14 wherein said elastic mounting support means contain springs having a reduction in the cross section of the spring influencing the area of inertia along said longitudinal axis, and means to orient said support means to govern the change in natural frequency and feed angle effected by the orientation of springs.

16. The two mass torsional swing motor of claim 14 wherein said elastic mounting support means contains springs having a preformed twist along said longitudinal axis, and means to orient said spring support means to govern the change in natural frequency and feed angle effected by this orientation of springs.

17. A two mass torsional pendulum swing motor including a reaction base mass supported on isolators and a frame mass supported for its compound vibration described by three orthogonal components of the excursions of points on the frame mass by at least three elastic mounting support means located in spaced relation about a central axis of rotation of said frame mass, said supporting means including cantilever springs units, means to secure the ends of said cantilever spring unit of each elastic mounting support means to said reaction base mass and to said frame mass to orient said spring units by a change in the angle of said spring units relative to the radii from said central axis and its radial position, said securing means, radially flexibly supporting said elastic mounting support means to influence the elastic stored energy and levels of stress of said cantilever springs associated with this flexibility to change the natural frequency and the feed angle of the system.

18. A two mass torsional pendulum swing motor including a reaction base mass supported on isolators and a feeder mass supported for compound vibration described by three orthogonal components of the excursions of points on the frame mass by at least three elastic mounting support means located in spaced relation about a central axis of rotation of said frame mass, said supporting means including cantilever spring units, means to secure the ends of the cantilever spring units of each elastic mounting support means to said reaction base mass and to said frame mass to radially position and orient said cantilever spring units relative to radii from said central axis, each said cantilever spring unit having a reduction in the area of inertia selectively accomplished by a reduction of cross sectional area and a preformed twist in the spring, so as to affect a change in the feed angle and natural frequency of the system.

19. A two mass torsional pendulum swing motor system including a base mass supported on isolators, a frame mass supported by at least three elastic mounting support means from said base mass for obtaining a compound vibration of said frame mass described by the three orthogonal components of the excursions of predetermined points located on the frame mass, said elastic mounting support means located in spaced relation about a central axis of rotation of said frame mass, means to secure said elastic mounting support means to said base mass and to said frame mass at aligned common radii from said central axis to orient said elastic mounting support means by a change in the mounting rotation angle of said elastic mounting support means relative to radii from said central axis to change the natural frequency and the feed angle of the swing motor system, wherein said elastic mounting support means each include a loop spring of strip material which may vary in rigidity around the loop and said securing means includes block members with bolts passing through said blocks to clamp the opposite sides of said loop springs to said base mass and said frame mass.

20. A two mass torsional pendulum swing motor system including a base mass supported on isolators, a frame mass supported by at least three elastic mounting support means from said base mass for obtaining a compound vibration of said frame mass described by the three orthogonal components of the excursions of predetermined points located on the frame mass, said elastic mounting support means located in spaced relation about a central axis of rotation of said frame mass, means to secure said elastic mounting support means to said base mass and to said frame mass at aligned common radii from said central axis to orient said elastic mounting support means by a change in the mounting rotation angle of said elastic mounting support means relative to radii from said central axis to change the natural frequency and the feed angle of the swing motor system, wherein said elastic mounting support means each includes a bowed cantilever spring, and said securing means includes block members with bolts passing therethrough to clamp opposite ends of said bowed cantilever springs to said frame mass and to said base mass.

21. A two mass torsional pendulum swing motor system including a base mass supported on isolators, a frame mass supported by at least three elastic mounting support means from said base mass for obtaining a compound vibration of said frame mass described by the three orthogonal components of the excursions of predetermined points located on the frame mass, said elastic mounting support means located in spaced relation about a central axis of rotation of said frame mass, means to secure said elastic mounting support means to said base mass and to said frame mass at aligned common radii from said central axis to orient said elastic mounting support means by a change in the mounting rotation angle of said elastic mounting support means relative to radii from said central axis to change the natural frequency and the feed angle of the swing motor system, wherein said elastic mounting support means each include a pair of torsion bars each fastened at one end to said base mass and said frame mass by said securing means, and a cantilever spring means adjustably secured to each torsion bar in spaced relation to said securing means.

22. A two mass torsional pendulum swing motor system including a base mass supported on isolators, a frame mass supported by at least three elastic mounting support means from said base mass for compound vibration described by three orthogonal components of the excursions of arbitrary points on the frame mass, said elastic mounting support means located in spaced relation about a central axis of rotation of said frame mass, means to secure said elastic mounting support means to said base mass at aligned common radii from said central axis to orient said elastic mounting support means by change in the radial positions of said elastic mounting support means relative to said central axis and in combination with a change in the mounting rotation angle of said elastic mounting support means to affect a change in feed angle and natural frequency of the swing motor system, wherein each of said elastic mounting support means includes a cantilever spring, a pair of cylindrical half blocks secured to each end of said cantilever spring, and said securing means including aligned cylindrical sockets in connecting blocks secured to said base mass and said frame mass and also includes swivel means for said connecting blocks and means to secure said cylindrical half blocks in different angular positions in said cylindrical sockets.

23. A two mass torsional pendulum swing motor system including a base mass supported on isolators, a frame mass supported by at least three elastic mounting support means from said base mass for compound vibration described by three orthogonal components of the excursions of arbitrary points on the frame mass, said elastic mounting support means located in spaced relation about a central axis of rotation of said frame mass, means to secure said elastic mounting support means to said base mass at aligned common radii from said central axis to orient said elastic mounting support means by change in the radial positions of said elastic mounting support means relative to said central axis and in combination with a change in the mounting rotation angle of said elastic mounting support means to affect a change in feed angle and natural frequency of the swing motor system, wherein each of said elastic mounting support means includes a cantilever spring attached at each of its ends to a block with a spherical outer surface and a cylindrical inner surface, said securing means including bolts passing through a washer and cylindrical blocks to dispose said cantilever spring at different inclination angles to the vertical and different mounting rotation angles and including spherical sockets in said masses to receive said outer surfaces of said blocks to clamp said blocks to said masses.

References Cited by the Examiner
UNITED STATES PATENTS

| | | | |
|---|---|---|---|
| 2,630,210 | 3/1953 | Carrier | 198—220 |
| 2,821,292 | 1/1958 | Spurlin | 198—220 |
| 2,985,280 | 5/1961 | Burgess | 198—220 |
| 3,048,260 | 8/1962 | Willis | 198—220 |
| 3,087,603 | 4/1963 | Petrea | 198—220 |

EDGAR W. GEOGHEGAN, *Primary Examiner.*